Oct. 7, 1941.   C. E. SMITH   2,258,424
HARDNESS TESTING MACHINE
Filed June 6, 1938   2 Sheets-Sheet 1
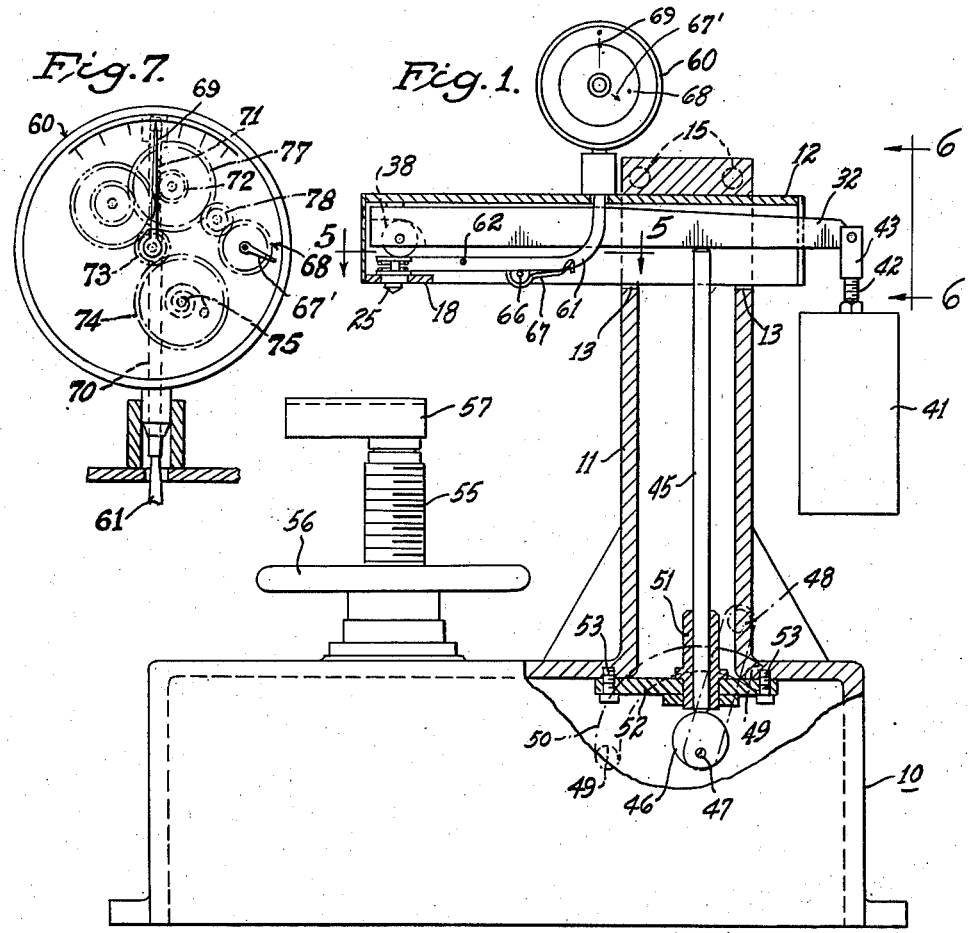
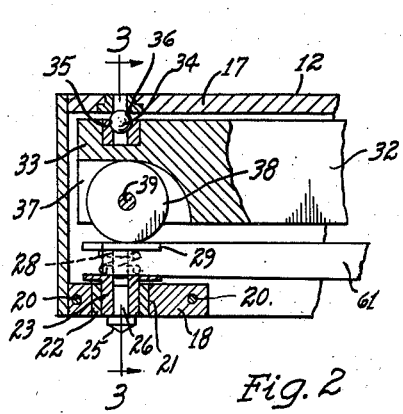
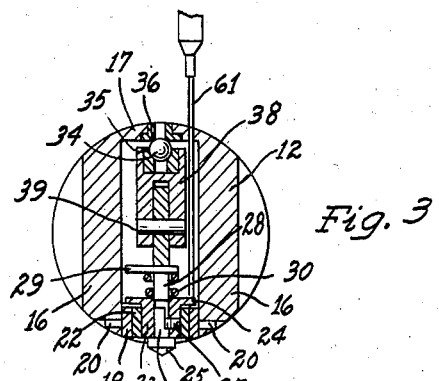
Inventor
CLARENCE E. SMITH.
By
Attorneys Oct. 7, 1941.   C. E. SMITH   2,258,424
HARDNESS TESTING MACHINE
Filed June 6, 1938   2 Sheets-Sheet 2

Inventor
CLARENCE E. SMITH.
By
Attorneys

Patented Oct. 7, 1941

2,258,424

UNITED STATES PATENT OFFICE 2,258,424

HARDNESS TESTING MACHINE

Clarence E. Smith, Dearborn, Mich., assignor to Pyro-Electro Instrument Co., Detroit, Mich., a corporation of Michigan Application June 6, 1938, Serial No. 211,989

4 Claims. (Cl. 265—16)

This invention relates in general to testing machines and more particularly to machines for testing the hardness of materials.

One of the objects of the present invention is to provide a new and improved machine for testing the hardness of materials.

Another object of the invention is to provide a hardness testing machine of a character such that the interior wall of a hollow or tubular member may be readily tested for hardness at any point therealong.

Another object of the invention is to provide a hardness testing machine having a new and improved arrangement of the operating parts thereof.

Other objects of the invention will become apparent from the following description taken in connection with the accompanying drawings which form a part of this specification and in which, Figure 1 is a view partly in front elevation and partly in section of a hardness testing machine embodying my invention;

Fig. 2 is an enlarged fragmentary view in cross section of certain details of the machine;

Fig. 3 is a view shown in cross section taken along the line 3—3 of Fig. 2;

Fig. 7 is a detailed view partly in section of the indicator 60.

Figure 6:
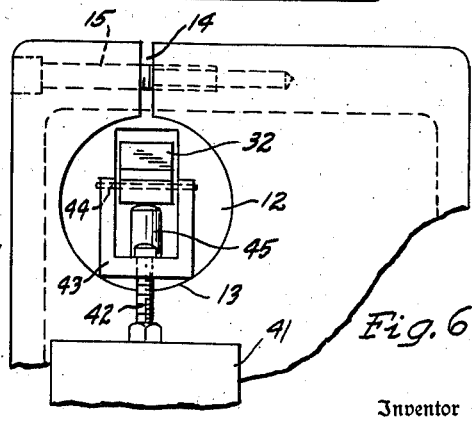
Fig. 6 is a fragmentary end view of the machine, taken in the direction of the arrows 6—6 of Fig. 1.

Referring to the drawings by characters of reference, the present hardness testing machine includes a hollow rectangular base 10 having, adjacent one end thereof, an upright hollow standard 11 on which is mounted a horizontal elongated, support or beam 12, overlying and extending longitudinally of the base 10. The beam 12, is supported in aligning apertures 13 in the standard 11 in the top of which is provided a slot 14, Fig. 6, through which screws 15 extend transversely thereof and thread into the standard 11 to normally hold the beam 12 against longitudinal movement, and to provide for longitudinal adjustment of the beam.

The beam 12 is open along its underside having spaced sides 16 joined by a top wall 17, and a supporting plate 18 is positioned within the beam 12 between the sides 16 and may be rigidly secured thereto by pins 20, the supporting plate 18 being disposed at the underside and adjacent one end of the beam. The supporting plate 18 is provided with an aperture 21 in which a bushing 22 is preferably secured against movement and slidably receives a vertically movable bushing 23 having, at its upper end, an external flange 24 for seating on the upper surface of the supporting plate 18. A penetrator 25, preferably a diamond, having a downwardly directed point, is carried by the vertically movable bushing 23 externally thereof and may have a stem 26 received in and secured to the bushing by a set screw 27, Fig. 3. Slidably received in the upper end of the vertically movable bushing 23, is a lost motion connecting means having a stem 28 provided at its upper end with an outturned flange 29, and surrounding the stem 28 there is a helical coil spring 30 having its upper end abutting the flange 29 of the stem 28 and its lower end abutting the flange 24 of the vertically movable bushing 23.

Extending within and longitudinally of the beam 12, between the beam side walls 16, a lever 32 is fulcrumed at one end 33 preferably on a ball 34 which seats in an upwardly opening socket 35 in the top of the lever and seats in a downwardly facing socket 36 in the top wall 17 of the beam 12. The fulcrum point of the lever 32 is preferably directly above the penetrator 25, as shown in Fig. 2. The lever end 33 which overlies the penetrator 25 is preferably provided in the underside thereof with a cutout 37 to receive a roller 38 mounted on the lever by a pin or shaft 39 and engaging the upper surface of the flange 29 of the vertically movable stem 28. The roller 38 reduces friction between the lever and the flange 29 and when the parts are in the positions shown in Figs. 1, 2 and 3 or prior to the testing operation, the axis of the roller is preferably slightly off center, of the pin 28, toward the free end of the lever 32.

The free end of the lever 32 projects externally of the beam 12 and pivotally attached thereto is a weight member 41, having a predetermined weight or potential force operable when released to pivot the lever 32 and move the penetrator 25 downwardly. The weight member 41, Fig. 6, may be secured by a screw 42, to a yoke 43 which may be pivoted to the free end of the lever 32 by a pin 44. A vertically movable rod 45 extends up through the hollow standard 11 and the upper end of the rod is adapted to engage the lower edge of the lever 32 to move and hold the lever in its up or inactive position against the action of the weight 41. The lower end of the rod 45 engages a cam 46 by means of which the rod is lowered and raised, the cam preferably being mounted on a shaft 47 having its opposite ends supported in opposite side walls of the base 10. A handle 48 may be provided to rotate the cam and the handle arm, movable on a quadrant 50 on the adjacent side wall of the base. The opposite ends of the quadrant 50 are provided with stop pins 49 engageable by the handle arm to limit movement of the arm in opposite directions. In the present instance, the vertical rod 45 is slidably received and guided in an open ended tubular guide member 51 which is secured in and to a plate 52 that overlies and closes the lower end of the hollow standard 11 and is secured to the base 10 by screws 53.

Supported by the base 10 beneath the penetrator 25, a vertically adjustable screw 55 is provided to cooperate with the penetrator 25 to support material to be tested, and a hand wheel 56 may be provided to raise and/or lower the screw as desired. Supported on the upper end of the screw 55 is a V-block 57 for supporting material to be tested, such as a sleeve or tubular-shaped member 58, and the block is preferably removable so that flat parts as well as tubular shaped parts may be given the hardness test by the same machine.

Figure 5:
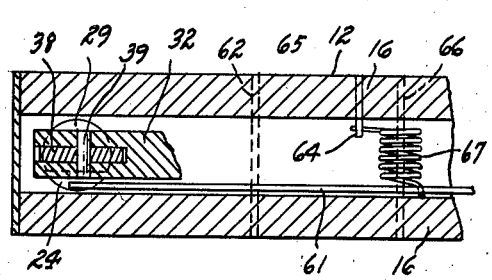
Fig. 5 is a view in section, taken along the line and in the direction of the arrows 5—5 of Fig. 1.

Mounted on the top wall of the beam 12 is an indicator 60 for indicating the degree of hardness of material and connected to the indicator is one end of an operating arm or lever 61 which has its other end loosely engaging or resting on the upper surface of the flange 24 of the vertically movable bushing 23 which moves with the penetrator 25. The lever 61 is pivoted intermediate its ends, Fig. 5, by a pin 62 which is carried by and has its opposite ends mounted in the sides 16 of the beam.

A second pin 66 having its opposite ends supported in the beam sides 16 is surrounded by a coil spring 67, one end of which is anchored to the pin 64 and the other end of which acts against the underside of the indicator lever 61 in a direction to pivot the lever in a counterclockwise direction, as seen facing Fig. 1 and holding the free end of the lever 61 in contact with the upper surface of the movable bushing flange 24. The indicator 60 has a pointer 67' and a mark 68 to indicate a minor or initial load which is placed on a piece of material under test to penetrate the outer crust of the metal and the indicator 60 is provided with a second pointer 69 to indicate the true hardness of the material under test. The indicator 60 is provided with a vertically movable rod 70 having its lower end in abutment with one end of the lever 61. Adjacent the upper end of the rod 70, a gear rack 71 is provided and meshes with a gear 72 of a train of gears including gear 73 which is fixed on a shaft on which the pointer 69 is also mounted. The gear 73 meshes with a larger gear 74 which is provided with a spirally wound spring 75 operable through the gear train to return the pointer 69 to its starting position. The smaller indicator hand 67' is mounted on a shaft on which is also mounted a gear 76 which is rotated from a gear 77 through an idler gear 78. When the minor load is applied, the lever 61 pivots in a clockwise direction, moving the rod 70 downwardly, which causes gear 77 to rotate in a counter-clockwise direction, which rotates gear 76 in a counterclockwise direction to move the hand 67' counter-clockwise toward the mark 68. When the major load is applied to the test piece, the weight 41 acting through the lever 32 moves the penetrator 25 further downwardly into the test piece 58, which movement permits the spring 67 to pivot the lever 61 in a counter-clockwise direction. As the lever 61 swings in a counterclockwise direction, it moves the rod 70 upwardly and through the gear train moves the pointer 69 in a clockwise direction to register the hardness of the test piece.

Figure 4:
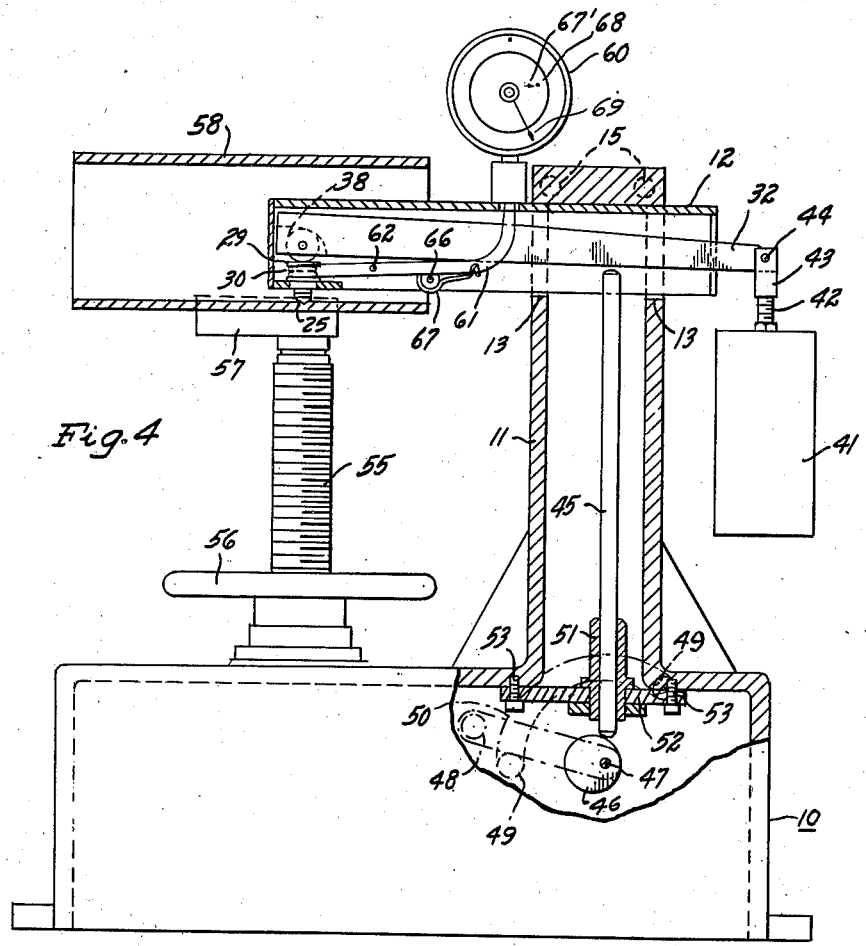
Fig. 4 is a view of the machine, similar to Fig. 1 but showing the parts of the machine in the positions they will assume on testing the hardness of material.

In operation of the present machine, a tubular member the hardness of the material of the side wall of which is to be tested is positioned over that end of the beam 12 which supports the penetrator 25 and then the screw 55 is raised by rotation of the wheel 56 raising the V-block 57 into engagement with the outer wall surface of the tubular member 58. By rotating the handwheel 56, the tubular member 58 is raised against the pointed end of the penetrator 25 and the penetrator and its vertically movable bushing 23 are raised slightly against the action of spring 30. During this time the penetrator 25 slightly penetrates or breaks the outer skin or crust of the tubular side wall, the hardness of which is not indicative of the average hardness of the material. This operation is commonly referred to as applying the minor load to the material and as this minor load is applied, the indicator operating lever 61 having its free end resting on the vertically movable bushing 23 is pivoted in a clockwise direction, Figs. 1 and 4, opposed by spring 67. As the lever 61 pivots in a clockwise direction, it draws the rod 70 downwardly, which through the train of gears causes the pointer 67' to rotate counterclockwise. The application of the minor load is discontinued after a predetermined load has been applied, said load being indicated when the inner pointer 67' of the indicator 60 points to the mark 68 on the indicator dial. During application of the minor load, upward movement of the penetrator 25 is not transmitted to the lever 32, due to the lost motion connection between the penetrator and the relatively movable abutment flange 29. The major load, to indicate the true degree of hardness of the tubular member 58 is now applied by rotating the cam 46 in a counterclockwise direction, Fig. 1, which permits the rod 45 to descend and move downward until its upper end is out of engagement with the lever 32. This releases the weight 41 which then effectively acts on the lever or beam 32 and pivots the lever in a clockwise direction, the application of the weight 41 urging the penetrator 25 further into the side wall of the tubular member to a depth corresponding to the hardness of the material. The weight 41 acts through the lever 32, roller 38, member 28, spring 30, bushing 23 to move the penetrator 25 downwardly. Upon the application of the major load, it will be understood that the adjacent coils of the spring 30 are moved into contact with each other, the spring becoming solid and as the bushing 22 moves downwardly under the load of the weight 41, the spring 67 correspondingly pivots the indicator operating lever 61 in a counterclockwise direction which pushes the rod 70 upwardly and through the train of gears causes the pointer 69 to swing clockwise. After the reading is taken, the cam 46 by means of the crank 49 is rotated in a direction to raise the rod 45 which engages and moves the lever 32 and weight 41 upwardly to their ineffective positions after which the tubular member may be released by lowering the screw supported V-block 57 by rotating the hand wheel 56 in the proper direction. It will be seen that with the present machine, the hardness test may be given at any point along the length of a tubular member by longitudinally adjusting the position of the horizontal beam 12 relative to the standard 11. When the position of the beam 12 is changed from its position shown in the drawings, the penetrator 25 will be out of alinement with the vertical axis of the screw 65 but a horizontal V-block, such as the block 57 will support the tubular member and adjustment of the beam will not affect the accuracy of the readings since all of the necessary operating parts including the indicator 60 are carried by the beam 12.

What I claim is:

1. In a hardness testing machine, a base having an upright hollow standard, a substantially horizontal hollow beam extending through said standard, said beam being mounted on said standard for longitudinal adjustment with respect to position, a penetrator carried by said beam adjacent one end thereof, a lever extending within and longitudinally of said beam and operatively connected to said penetrator, said lever extending through said hollow upright standard, a weight member on said lever and operable to exert a force to urge said penetrator into material under test, a vertically reciprocal rod within said standard and at its upper end loosely abutting said lever intermediate said penetrator and said weight member, means within said base for reciprocating said rod, and a hardness indicator mounted on said beam and operatively connected to said penetrator.

2. In a hardness testing machine, a base having an upright member, a hollow beam mounted on said upright member and adjustable substantially horizontally relative to said upright member, means on said base for supporting a test piece, a penetrator member carried by said beam adjacent one end thereof above said means, means operable to exert a force to move said penetrator into the test piece and carried by said beam, means operatively connecting said force exerting means and said penetrator and disposed within and carried by said beam, and an indicator carried by said beam and operatively connected to said last-named means.

3. In a hardness testing machine, a base having an upright member, a hollow beam mounted on said upright member and adjustable substantially horizontally relative thereto, means on said base for supporting a test piece, a penetrator member carried by said beam adjacent one end thereof above said means, means operable to exert a force to move said penetrator member into the test piece and carried by said beam, means operatively connecting said force exerting means and said penetrator member and disposed within and carried by said beam, an indicator carried by said beam, and tensioned means within said beam acting to operate said indicator and controlled by and upon movement of said penetrator member.

4. In a machine for testing the hardness at any point along the side wall of a tubular member, a standard, a substantially horizontal elongated hollow beam mounted for horizontal adjustment on said standard and over one end of which the tubular member is positioned, a penetrator for penetrating the inner wall surface of the tubular member at a desired point and movable in opposite directions relative to said beam, a lever fulcrumed on and extending longitudinally within said hollow beam, means supporting said tubular member and movable for initially penetrating the wall of said tubular member and at the same time moving said penetrator in one direction, lost motion means operatively connecting said penetrator and said lever and preventing transmission of movement of said penetrator in said one direction to said lever, indicating means carried by said beam, and means within said beam and operatively connecting said indicating means and said lost motion means.

CLARENCE E. SMITH.